United States Patent
Nishihiro et al.

(10) Patent No.: US 10,661,801 B2
(45) Date of Patent: May 26, 2020

(54) CONTROL DEVICE FOR VEHICLE AND CONTROL METHOD FOR VEHICLE

(71) Applicants: JATCO Ltd, Fuji-shi, Shizuoka (JP); NISSAN MOTOR CO., LTD., Yokohama-shi, Kanagawa (JP)

(72) Inventors: Yoshimasa Nishihiro, Zama (JP); Yusuke Oota, Ebina (JP); Shintaro Ohshio, Kanagawa (JP)

(73) Assignees: JATCO LTD, Fuji-Shi (JP); NISSAN MOTOR CO., LTD., Yokohama-Shi (JP)

(*) Notice: Subject to any disclaimer, the term of this patent is extended or adjusted under 35 U.S.C. 154(b) by 0 days.

(21) Appl. No.: 16/319,280

(22) PCT Filed: Jul. 11, 2017

(86) PCT No.: PCT/JP2017/025304
§ 371 (c)(1),
(2) Date: Jan. 18, 2019

(87) PCT Pub. No.: WO2018/016391
PCT Pub. Date: Jan. 25, 2018

(65) Prior Publication Data
US 2019/0225222 A1    Jul. 25, 2019

(30) Foreign Application Priority Data
Jul. 19, 2016  (JP) .................. 2016-141577

(51) Int. Cl.
B60W 10/02    (2006.01)
B60W 10/06    (2006.01)
(Continued)

(52) U.S. Cl.
CPC ...... B60W 30/18072 (2013.01); B60W 10/02 (2013.01); B60W 10/06 (2013.01);
(Continued)

(58) Field of Classification Search
CPC .... B60W 10/02; B60W 10/06; B60W 10/101; B60W 10/107; B60W 30/18072;
(Continued)

(56) References Cited

U.S. PATENT DOCUMENTS

2009/0132135 A1*  5/2009  Quinn, Jr. ........... F16H 61/6649
                                                       701/55
2013/0042617 A1*  2/2013  Atkins .................. B60K 6/105
                                                        60/698

(Continued)

FOREIGN PATENT DOCUMENTS

JP    H09-112672 A     5/1997
JP    2013-213557 A   10/2013
(Continued)

Primary Examiner — Edwin A Young
(74) Attorney, Agent, or Firm — Foley & Lardner LLP

(57) ABSTRACT

A transmission controller gives an engagement instruction to a forward clutch so that the forward clutch is engaged when a rotation speed of the engine becomes a target engine rotation speed set on the basis at least of a vehicle speed and a speed ratio of a continuously variable transmission after the engine is started, if a cancellation request for a sailing-stop control is made during execution of the sailing-stop control, and the continuously variable transmission is down-shifted before the forward clutch is engaged, if the target engine rotation speed when the cancellation request for the sailing-stop control is made is less than a first predetermined value.

7 Claims, 3 Drawing Sheets

(51) Int. Cl.
| | |
|---|---|
| *B60W 10/101* | (2012.01) |
| *B60W 30/18* | (2012.01) |
| *B60W 10/107* | (2012.01) |
| *F16H 61/662* | (2006.01) |
| *F16H 63/50* | (2006.01) |
| *F16H 63/46* | (2006.01) |
| *F02D 29/00* | (2006.01) |
| *F16H 59/44* | (2006.01) |
| *F16H 61/02* | (2006.01) |
| *F02D 29/02* | (2006.01) |
| *F16H 59/70* | (2006.01) |
| *F16H 37/02* | (2006.01) |

(52) U.S. Cl.
CPC ........ *B60W 10/101* (2013.01); *B60W 10/107* (2013.01); *F02D 29/00* (2013.01); *F02D 29/02* (2013.01); *F16H 59/44* (2013.01); *F16H 59/70* (2013.01); *F16H 61/02* (2013.01); *F16H 61/662* (2013.01); *F16H 63/46* (2013.01); *F16H 63/50* (2013.01); *B60W 2030/1809* (2013.01); *B60W 2510/0638* (2013.01); *B60W 2510/1005* (2013.01); *B60W 2520/10* (2013.01); *B60W 2710/021* (2013.01); *B60W 2710/0644* (2013.01); *B60W 2710/1005* (2013.01); *B60Y 2400/72* (2013.01); *F16H 37/022* (2013.01); *F16H 2037/026* (2013.01)

(58) Field of Classification Search
CPC ... B60W 2510/0638; B60W 2710/021; B60W 2710/0644; B60W 2710/1005; F16H 61/662
See application file for complete search history.

(56) References Cited

U.S. PATENT DOCUMENTS

| | | | |
|---|---|---|---|
| 2013/0151129 A1* | 6/2013 | Tatewaki | ................ F02D 45/00 701/112 |
| 2014/0207348 A1* | 7/2014 | Wakayama | ........... F02D 41/123 701/54 |
| 2016/0272208 A1 | 9/2016 | Yamanaka et al. | |
| 2017/0028990 A1 | 2/2017 | Buzzetti et al. | |

FOREIGN PATENT DOCUMENTS

| | | |
|---|---|---|
| JP | 2014-231889 A | 12/2014 |
| JP | 2015-094377 A | 5/2015 |
| JP | 2015-117738 A | 6/2015 |

* cited by examiner

CONTROL DEVICE FOR VEHICLE AND CONTROL METHOD FOR VEHICLE

TECHNICAL FIELD

The present invention relates to a control device for a vehicle and a control method for a vehicle.

BACKGROUND ART

Conventionally, a sailing-stop control which brings an automatic transmission to neutral (power shut-off state) when the following conditions (a) to (d) are met and stops an engine has been known.

(a) D (forward) range is selected;
(b) A vehicle speed is a set vehicle speed or more (middle to high vehicle speed);
(c) An accelerator pedal is not stepped on (Accelerator OFF); and
(d) A brake pedal is not stepped on (Brake OFF).

Such technology is disclosed in JP2013-213557A, as free-run, for example.

SUMMARY OF INVENTION

An automatic transmission has a power transmission mechanism such as a forward/reverse switching mechanism, a sub-transmission mechanism and the like and can be brought into a neutral state by disengaging an engagement element of the power transmission mechanism.

When the sailing-stop control is to be cancelled, an engine is re-started, and the engagement element is engaged. Here, if an input/output rotation speed difference of the power transmission mechanism is large, there is a concern that an engagement shock of the engagement element becomes large.

Moreover, since an engine rotation speed rapidly rises immediately after the engine start, there is a period during which the engine rotation speed cannot be controlled easily. Thus, if the engine rotation speed at which the input/output rotation speed difference of the power transmission mechanism becomes small is low, the engagement shock of the engagement element can be considered to be made smaller by delaying engagement of the engagement element until lowers the rotation speed of the engine to a target engine rotation speed after rises the rotation speed of the started engine.

On the other hand, when the sailing-stop control is to be cancelled, the engagement element is preferably engaged as early as possible. By engaging the engagement element early, if the accelerator is turned ON during the sailing-stop control, for example, response until a driving force is generated can be expedited. Moreover, if the brake is turned ON during the sailing-stop control or if a vehicle speed lowers and inertia running is continued after that, fuel efficiency can be improved by driving an alternator or an oil pump by power from a driving wheel.

The present invention was made in view of such technical problem and has an object to shorten time until the engagement element is engaged when the sailing-stop control is to be cancelled.

According to one aspect of the present invention, a control device for a vehicle including an engine and an automatic transmission having a variator and a power transmission mechanism, the control device includes a control unit configured to execute a sailing-stop control which stops the engine and disengages an engagement element provided in the power transmission mechanism during running of the vehicle, wherein the control unit is configured to give an engagement instruction to the engagement element so that the engagement element is engaged when a rotation speed of the engine becomes a target engine rotation speed set on the basis at least of a vehicle speed and a speed ratio of the variator after the engine is started, if a cancellation request for the sailing-stop control is made during execution of the sailing-stop control, and the control unit is configured to downshift the variator before the engagement element is engaged, if the target engine rotation speed when the cancellation request for the sailing-stop control is made is less than a first predetermined value.

According to another aspect of the present invention, a control method for a vehicle including an engine and an automatic transmission having a variator and a power transmission mechanism, the control method includes executing a sailing-stop control which stops the engine and disengages an engagement element provided in the power transmission mechanism during running of the vehicle, giving an engagement instruction to the engagement element so that the engagement element is engaged when a rotation speed of the engine becomes a target engine rotation speed set on the basis at least of a vehicle speed and a speed ratio of the variator after the engine is started, if a cancellation request for the sailing-stop control is made during execution of the sailing-stop control, and downshifting the variator before the engagement element is engaged, if the target engine rotation speed when the cancellation request for the sailing-stop control is made is less than a first predetermined value.

In these aspects, if the target engine rotation speed when the cancellation request for the sailing-stop control is made is less than the first predetermined value, the variator is down-shifted. Thus, the target engine rotation speed set on the basis at least of the vehicle speed and a speed ratio of the variator is raised. According to this, time until the rotation speed of the started engine becomes the target engine rotation speed can be shortened. Thus, time until the engagement of the engagement element can be shortened.

DESCRIPTION OF EMBODIMENTS

Hereinafter, an embodiment of the present invention will be described by referring to the attached drawings. In the following, when a speed ratio is large, it is referred to as Low, while if the speed ratio is small, it is referred to as High. Moreover, when the speed ratio is changed to a Low side, it is referred to as downshift, while a change to a High side is referred to as upshift.

Figure 1:
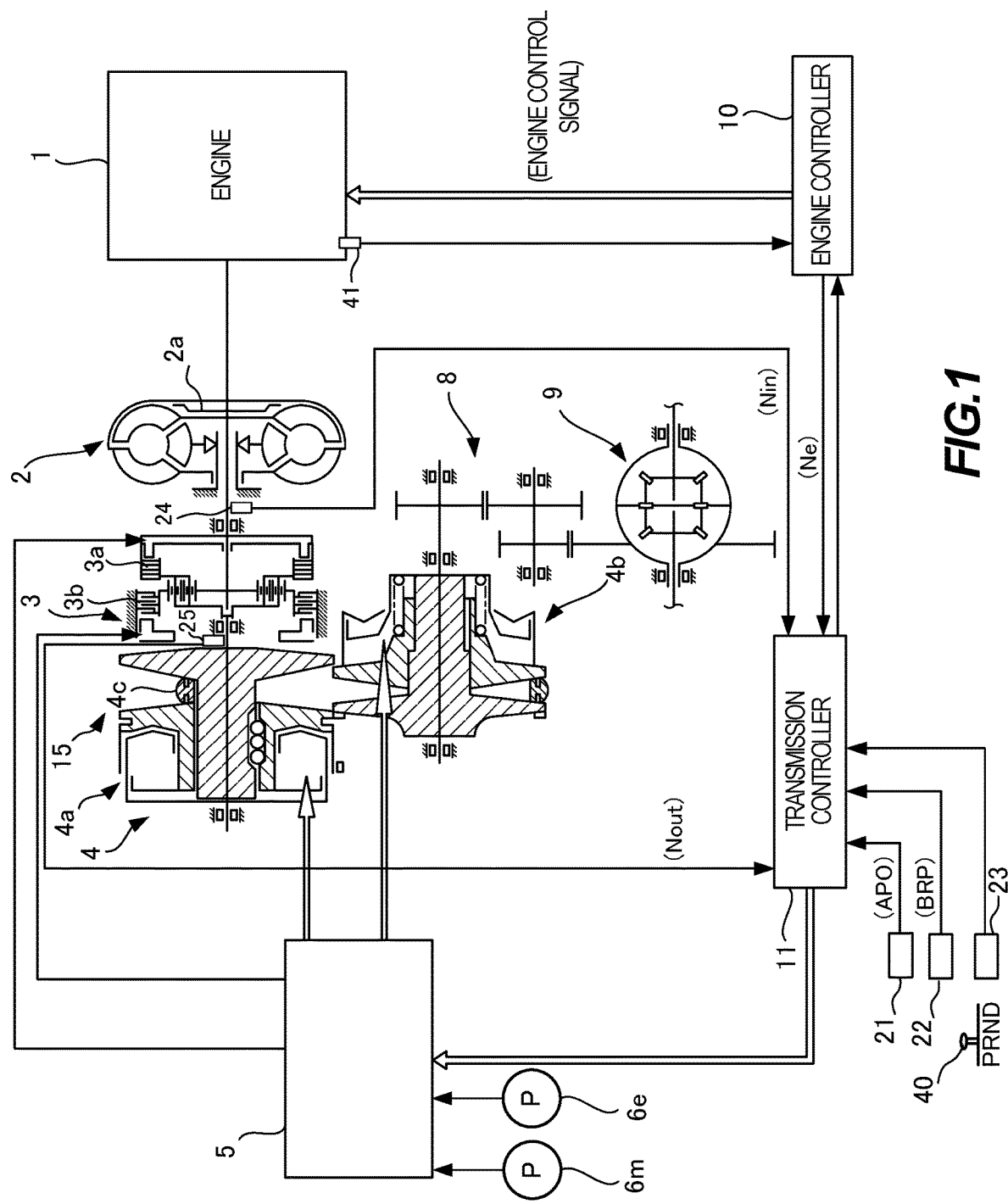
FIG. 1 is a schematic configuration diagram of a vehicle according to an embodiment of the present invention.

FIG. 1 is a schematic configuration diagram of a vehicle according to the embodiment of the present invention. The vehicle includes an engine 1, a torque converter 2, a forward/reverse switching mechanism 3 as a power transmission mechanism, a continuously variable transmission 4 as a variator, a hydraulic control circuit 5, a first oil pump 6m, a second oil pump 6e, an engine controller 10, and a transmission controller 11. In the vehicle, rotation generated in the engine 1 is transmitted to a wheel, not shown, through the torque converter 2, the forward/reverse switching mechanism 3, the continuously variable transmission 4, a gear set 8, and a differential gear device 9. An automatic transmission 15 is constituted by the forward/reverse switching mechanism 3 and the continuously variable transmission 4.

The torque converter 2 has a lockup clutch 2a, and when the lockup clutch 2a is engaged, an input shaft and an output shaft of the torque converter 2 are directly connected, and the input shaft and the output shaft are rotated at the same speed.

The forward/reverse switching mechanism 3 has a double-pinion planetary gear set as a main constituent element, in which its sun gear is connected to the engine 1 through the torque converter 2, and a carrier is connected to a primary pulley 4a. The forward/reverse switching mechanism 3 further includes a forward clutch 3a as an engagement element adapted to directly connect the sun gear and the carrier of the double-pinion planetary gear set and a reverse brake 3b adapted to fix a ring gear, and input rotation from the engine 1 via the torque converter 2 is transmitted to the primary pulley 4a as it is at engagement of the forward clutch 3a, and the input rotation from the engine 1 via the torque converter 2 at the engagement of the reverse brake 3b is reversed and reduced and transmitted to the primary pulley 4a.

The continuously variable transmission 4 includes the primary pulley 4a, the secondary pulley 4b, and a belt 4c. In the continuously variable transmission 4, a hydraulic pressure supplied to the primary pulley 4a and a hydraulic pressure supplied to the secondary pulley 4b are controlled, whereby a contact radius between each of the pulleys 4a and 4b and the belt 4c is changed, and a speed ratio Rv is changed.

The first oil pump 6m is a mechanical oil pump to which the rotation of the engine 1 is input and driven by using a part of power of the engine 1. Oil discharged from the first oil pump 6m by the driving of the first oil pump 6m is supplied to the hydraulic control circuit 5. When the engine 1 is stopped, the first oil pump 6m is not driven, and the oil is not discharged from the first oil pump 6m.

The second oil pump 6e is an electric oil pump to which electric power is supplied from a battery and driven. The oil can be supplied to the hydraulic control circuit 5 even while the engine is stopped by driving the second oil pump 6e when the first oil pump 6m is not driven.

The hydraulic control circuit 5 is constituted by a plurality of channels, a plurality of hydraulic actuators and the like. The hydraulic actuator is constituted by a solenoid and a hydraulic control valve. In the hydraulic control circuit 5, the hydraulic actuator is controlled on the basis of a control signal from the transmission controller 11 so as to switch a supply path of the hydraulic pressure, and a required hydraulic pressure is prepared from a line pressure PL generated by the oil discharged from the first oil pump 6m and the second oil pump 6e. The hydraulic control circuit 5 supplies the prepared hydraulic pressure to each portion of the continuously variable transmission 4, the forward/reverse switching mechanism 3, and the torque converter 2.

The transmission controller 11 is constituted by a CPU, a ROM, a RAM and the like. In the transmission controller 11, a function of the transmission controller 11 is exerted when the CPU reads out and executes a program stored in the ROM.

A signal from an accelerator pedal opening sensor 21 adapted to detect an accelerator pedal opening APO, a signal from a brake fluid pressure sensor 22 adapted to detect a brake fluid pressure BRP corresponding to an operation amount of a brake pedal, a signal from an inhibitor switch 23 adapted to detect a position of a shift lever 40 are input into the transmission controller 11. Moreover, a signal from an input-side rotation speed sensor 24 adapted to detect a rotation speed Nin on an input side (a side of the engine 1) of the forward/reverse switching mechanism 3, a signal from an output-side rotation speed sensor 25 adapted to detect a rotation speed Nout on an output side (a side of the continuously variable transmission 4) of the forward/reverse switching mechanism 3, a signal from a rotation speed sensor (not shown) adapted to detect a rotation speed on the output side of the continuously variable transmission 4, a signal from a rotation speed sensor 41 adapted to detect a rotation speed Ne of the engine 1 and the like are input into the transmission controller 11.

The transmission controller 11 and the engine controller 10 are capable of communication with each other. The transmission controller 11 and the engine controller 10 may be integrated to make one controller.

In this embodiment, when the sailing-stop condition is met during running of the vehicle, fuel injection to the engine 1 is stopped so as to stop the engine 1, and the sailing-stop control in which the forward clutch 3a and the reverse brake 3b are disengaged in the forward/reverse switching mechanism 3 and a neutral state is brought about is executed.

As a result, an inertia running distance in a state where the engine 1 is stopped becomes longer, and fuel efficiency of the engine 1 can be improved.

The sailing-stop conditions are following conditions, for example:

(a) D(forward) range is selected by the shift lever 40;
(b) A vehicle speed VSP is a set vehicle speed or more;
(c) The accelerator pedal is not stepped on (Accelerator OFF); and
(d) The brake pedal is not stepped on (Brake OFF).

The set vehicle speed is a middle-to-high vehicle speed and is set in advance.

The sailing-stop condition is met when all the aforementioned conditions (a) to (d) are satisfied, and when any one of the aforementioned (a) to (d) is not satisfied, it is not met.

If the sailing-stop condition is no longer met during the sailing-stop control, it is considered that a cancellation request for the sailing-stop control is made, and the sailing-stop control is cancelled, the engine 1 is started, and the forward clutch 3a is engaged. That is, the sailing-stop condition is also a sailing-stop cancellation condition for cancelling the sailing-stop control. The sailing-stop condition may be a condition different from the sailing-stop cancellation condition. Execution and cancellation of the sailing-stop control is executed by the transmission controller 11.

When the sailing-stop control is to be cancelled, if a rotation speed difference between the input-side rotation speed Nin and the output-side rotation speed Nout of the forward/reverse switching mechanism 3 is large, there is a concern that an engagement shock of the forward clutch 3a becomes larger.

Thus, the engagement of the forward clutch 3a is preferably performed in a state where the rotation speed Ne of the engine 1 is controllable so that the rotation speed difference between the input-side rotation speed Nin and the output-side rotation speed Nout of the forward/reverse switching mechanism 3 can be made smaller.

However, since the engine rotation speed Ne rapidly rises immediately after start of the engine 1, there is a period of time during which the engine rotation speed Ne cannot be controlled easily. Thus, if the engine rotation speed Ne at which the rotation speed difference between the input-side rotation speed Nin and the output-side rotation speed Nout of the forward/reverse switching mechanism 3 is made smaller is low, the engagement shock can be considered to be made smaller by delaying the engagement of the forward clutch 3a until lowers the rotation speed Ne of the engine 1 to a target engine rotation speed TNe after rises the rotation speed Ne of the started engine 1.

On the other hand, when the sailing-stop control is to be cancelled, the forward clutch 3a is preferably engaged as early as possible. By engaging the forward clutch 3a early, if the sailing-stop cancellation condition is met by the accelerator ON, for example, response until the driving force is generated can be expedited. Moreover, if the sailing-stop cancellation condition is met by the brake ON, or if the vehicle speed VSP lowers and then, the inertia running is continued, fuel efficiency can be improved by driving the alternator (not shown) or the first oil pump 6m by power from the driving wheel.

Figure 2:
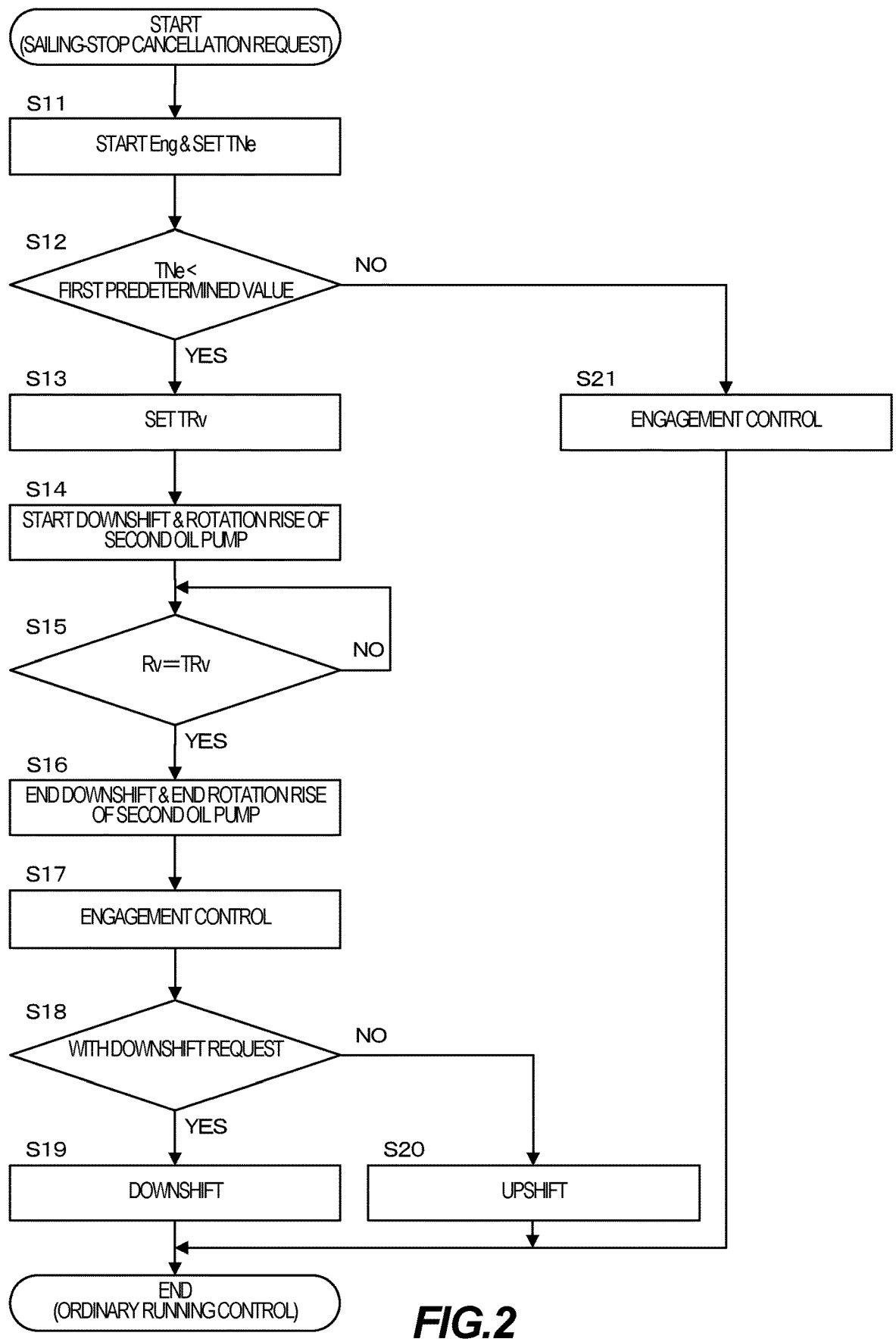
FIG. 2 is a flowchart illustrating contents of control executed by a controller.

Thus, the transmission controller 11 of this embodiment is configured to execute processing illustrated in a flowchart in FIG. 2 so that time to the engagement of the forward clutch 3a is shortened when the sailing-stop control is to be cancelled.

The target engine rotation speed TNe during ordinary running (before start of the sailing-stop control) and during the sailing-stop control is determined on the basis of an ordinary speed ratio map, that is, on the basis of the accelerator pedal opening APO and the vehicle speed VSP.

In the following, contents of the processing executed by the transmission controller 11 when the cancellation request for the sailing-stop control is made will be described by referring to FIG. 2.

At Step S11, the transmission controller 11 outputs a start instruction of the engine 1 to the engine controller 10 so as to start the engine 1. Moreover, the target engine rotation speed TNe is calculated and set on the basis of the vehicle speed VSP and a through speed ratio of the automatic transmission 15.

The through speed ratio of the automatic transmission is a speed ratio considering a speed ratio Rv of the variator, a speed ratio of the power transmission mechanism after the engagement of the engagement element and if there is a gear on a power transmission path, a gear ratio of the gear.

The speed ratio of the power transmission mechanism is considered because there is a case where the speed ratio of the power transmission mechanism after the engagement of the engagement element is other than 1. If the speed ratio of the power transmission mechanism is 1, it is equal to substantially no consideration.

That is, the target engine rotation speed TNe is calculated and set on the basis at least of the vehicle speed VSP and the speed ratio of Rv of the variator.

In this embodiment, since a speed reduction ratio of the forward/reverse switching mechanism 3 is 1, and the continuously variable transmission 4 is set to the Highest speed ratio during the sailing-stop control, unlike the aforementioned calculation method of the target engine rotation speed TNe on the basis of the ordinary speed ratio map, the target engine rotation speed TNe is calculated on the basis of the vehicle speed VSP and the Highest speed ratio of the continuously variable transmission 4 regardless of the accelerator pedal opening APO.

The target engine rotation speed TNe is set so that a relationship between the input-side rotation speed Nin and the output-side rotation speed Nout of the forward/reverse switching mechanism 3 satisfies the following equation (1) or equation (2), for example, if the forward clutch 3a is engaged when the engine rotation speed Ne becomes the target engine rotation speed TNe.

$$|Nin-R \times Nout| \leq \text{predetermined value} \quad \text{Equation (1)}$$

$$R-\text{predetermined value} \leq Nin/Nout \leq R+\text{predetermined value} \quad \text{Equation (2)}$$

R: speed ratio of the forward/reverse switching mechanism 3 when the forward clutch 3a is engaged The equation (1) means that the forward clutch 3a is engaged when the value obtained by multiplying the output-side rotation speed Nout by the speed ratio R is substantially equal to the input-side rotation speed Nin. Moreover, the equation (2) means that the forward clutch 3a is engaged when a ratio of the input/output rotation of the forward/reverse switching mechanism 3 becomes a value close to the speed ratio R.

At Step S12, the transmission controller 11 determines whether the set target engine rotation speed TNe is less than a first predetermined value or not.

The first predetermined value is set within a range not larger than a rotation speed at a blown-up peak when the engine 1 is started. It is 1100 rpm or less, for example. The first predetermined value may be a value equal to the rotation speed at the blown-up peak.

Moreover, the first predetermined value may be a minimum value within a range of the rotation speed which is controllable during ordinary operation of the engine 1, for example, not within the range not larger than the rotation speed at the blown-up peak when the engine 1 is started.

When the transmission controller 11 determines that the set target engine rotation speed TNe is less than the first predetermined value, it moves the processing to Step S13. Moreover, if it determines that the set target engine rotation speed TNe is not smaller than the first predetermined value, it moves the processing to Step S21 and executes engagement control and then, moves to ordinary running control.

In the engagement control, when the engine rotation speed Ne rises to a rotation speed smaller than the target engine rotation speed TNe by a predetermined rotation speed, a hydraulic pressure Pf is supplied from the hydraulic control circuit 5 to the forward clutch 3a in accordance with an engagement start instruction from the transmission controller 11, and the engagement of the forward clutch 3a is started. The predetermined rotation speed is 200 rpm, for example.

After the engagement start instruction of the forward clutch 3a, there is a time lag until the forward clutch 3a is actually engaged. Thus, by giving the engagement start instruction of the forward clutch 3a by considering the time lag, the forward clutch 3a can be engaged at timing when the engine rotation speed Ne becomes the target engine rotation speed TNe.

The engagement start instruction corresponds to an electric current change instruction to a control solenoid valve so that a clutch pressure of the forward clutch 3a is raised, for example.

At Step S13, the transmission controller 11 sets a target speed ratio TRv for downshifting the continuously variable transmission 4.

As described above, the engine rotation speed Ne rapidly rises immediately after the start of the engine 1. Thus, if the target engine rotation speed TNe is low, for example, the forward clutch 3a is engaged after the engine rotation speed Ne rises to the blown-up peak and then, the engine rotation speed Ne lowers to the target engine rotation speed TNe.

That is, the lower the target engine rotation speed TNe is, the more the engagement of the forward clutch 3a is delayed. Thus, if the target engine rotation speed TNe is low, the target engine rotation speed TNe is raised by downshifting the continuously variable transmission 4 so that the forward clutch 3a can be engaged at earlier timing.

Since the target engine rotation speed TNe can be raised by downshifting the continuously variable transmission 4 even for a small amount, time until the forward clutch 3a is engaged can be shortened.

If the continuously variable transmission 4 is downshifted so that the target engine rotation speed TNe becomes in the vicinity of the rotation speed at the blown-up peak at the start of the engine 1, the time until the forward clutch 3a is engaged can be further shortened.

Specifically, it is only necessary that the target speed ratio TRv is set and the continuously variable transmission 4 is downshifted so that an absolute value of a difference between the target engine rotation speed TNe and the rotation speed at the blown-up peak at the start of the engine 1 becomes less than a second predetermined value.

The second predetermined value is set as a rotation speed difference which can allow the engagement shock of the forward clutch 3a. The rotation speed difference which can allow the engagement shock can be set by grasping a range which is not recognized by a driver as a shock even if a small shock is actually generated by a functional test or the like.

Moreover, it is more preferable that the continuously variable transmission 4 is downshifted so that the target engine rotation speed TNe becomes equal to the rotation speed at the blown-up peak at the start of the engine 1 so that the time until the forward clutch 3a is engaged can be further shortened.

At Step S14, the transmission controller 11 starts the downshift of the continuously variable transmission 4. Moreover, the rotation of the second oil pump 6e is raised so as to raise the line pressure PL so that the line pressure PL does not run short.

At Step S15, the transmission controller 11 determines whether the speed ratio Rv of the continuously variable transmission 4 has become the target speed ratio TRv or not.

When the transmission controller 11 determines that the speed ratio Rv of the continuously variable transmission 4 has become the target transmission ratio TRv, it ends the downshift of the continuously variable transmission 4 and also ends rotation rise of the second oil pump 6e (Step S16). Moreover, if it determines that the speed ratio Rv of the continuously variable transmission 4 has not become the target speed ratio TRv, it repeatedly executes the processing at Step S15.

The rotation rise of the second oil pump 6e may be ended at a point of time when the required line pressure PL can be ensured by the first oil pump 6m. The engine rotation speed Ne which can ensure the required line pressure PL by the first oil pump 6m is 500 rpm, for example.

At Step S17, the transmission controller 11 executes the engagement control. Contents of the engagement control are similar to those at Step S21.

At Step S18, the transmission controller 11 determines whether the cancellation request for the sailing-stop control is accompanied by a downshift request.

In this embodiment, the case where the cancellation request for the sailing-stop control is accompanied by the downshift request is a case where the sailing-stop cancellation condition is met by the accelerator turned ON.

When the transmission controller 11 determines that there is a downshift request, it further downshifts the continuously variable transmission 4 (Step S19) and moves the processing to the ordinary running control after that. Moreover, when it determines that there is no downshift request, it upshifts the continuously variable transmission 4 (Step S20) and moves the processing to the ordinary running control after that.

According to this, if the cancellation request for the sailing-stop control is accompanied by the downshift request, downshift can be performed stepwisely, whereby generation response of the driving force is improved.

Moreover, if the cancellation request for the sailing-stop control is not accompanied by the downshift request, occurrence of acceleration in the vehicle not intended by the driver can be suppressed by upshifting the continuously variable transmission 4 after the forward clutch 3a is engaged.

After the cancellation of the sailing-stop control, similarly to before the start of the sailing-stop control, the target engine rotation speed TNe is determined on the basis of the ordinary speed ratio map, that is, the accelerator pedal opening APO and the vehicle speed.

Figure 3:
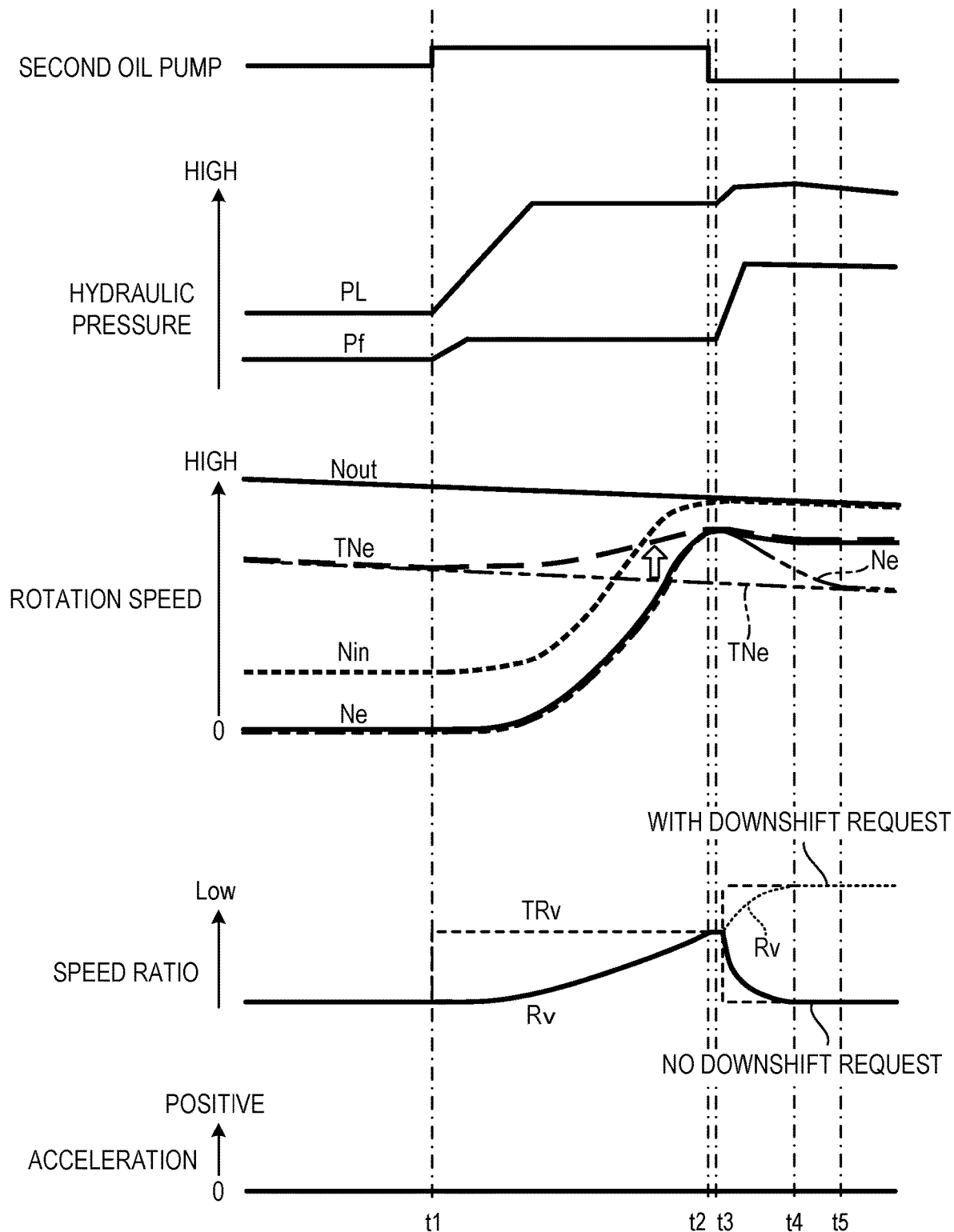
FIG. 3 is a time chart when a sailing-stop control is cancelled.

Subsequently, a state where the sailing-stop control is cancelled will be described by referring to a time chart in FIG. 3. FIG. 3 illustrates a case where the target engine rotation speed TNe is less than the first predetermined value.

The target engine rotation speed TNe (two-dot chain line) and the engine rotation speed Ne (two-dot chain line) illustrate a case where the continuously variable transmission 4 is not downshifted even if the target engine rotation speed TNe is less than the first predetermined value.

Before time t1, the sailing-stop control is executed. Since the sailing-stop control is executed at the middle-to-high vehicle speed, the speed ratio Rv of the continuously variable transmission 4 is on the High side.

When the cancellation request for the sailing-stop control is made at time t1, the engine 1 is started. Moreover, the second oil pump 6e is driven, and the line pressure PL is raised. Moreover, the hydraulic pressure Pf is supplied to the forward clutch 3a so as to bring about a state (standby state) immediately before a torque capacity is given.

Then, from the time t1 to time t2, the continuously variable transmission 4 is downshifted so that the speed ratio Rv becomes the target speed ratio TRv. Specifically, the speed ratio Rv of the continuously variable transmission 4 is changed by the hydraulic pressure supplied to the continuously variable transmission 4 by following the target speed ratio TRv. As a result, as indicated by an arrow, the target engine rotation speed TNe is raised from the target engine rotation speed TNe (two-dot chain line) so as to become equal to the rotation speed at the blown-up peak of the engine 1.

Moreover, the input-side rotation speed Nin of the forward clutch 3a becomes high as the engine 1 is started.

When the speed ratio Rv matches the target speed ratio TRv at the time t2, the downshift of the continuously variable transmission 4 ends, and the rotation rise of the second oil pump 6e ends. As described above, the rotation rise of the second oil pump 6e may end at a point of time when the required line pressure PL can be ensured by the first oil pump 6m. In this case, the rotation rise of the second oil pump 6e ends between the time t1 and the time t2.

At time t3, the hydraulic pressure Pf is raised by the engagement control. As a result, the forward clutch 3a is engaged.

If the continuously variable transmission 4 is not downshifted even if the target engine rotation speed TNe is less than the first predetermined value as indicated by the target engine rotation speed TNe (two-dot chain line) and the engine rotation speed Ne (two-dot chain line), the engagement of the forward clutch 3a is delayed until time t5.

After the engagement control is executed at time t3, if the cancellation request for the sailing-stop control is not accompanied by the downshift request, the continuously variable transmission 4 is upshifted (the speed ratio Rv indicated by a solid line). Moreover, if the downshift request accompanies, the continuously variable transmission 4 is downshifted (the speed ratio Rv indicated by a dot line). Each chart illustrating the second oil pump, the hydraulic pressure, the rotation speed, and acceleration corresponds to the case with the downshift request.

At time t4, the ordinary running control is started.

As described above, according to this embodiment, if the target engine rotation speed TNe when the cancellation request for the sailing-stop control is made is less than the first predetermined value, the continuously variable transmission 4 is downshifted. Thus, the target engine rotation speed TNe set on the basis at least of the vehicle speed VSP and the speed ratio Rv of the continuously variable transmission 4 is raised. According to this, the time until the rotation speed Ne of the started engine 1 becomes the target engine rotation speed TNe can be shortened. Thus, the time to the engagement of the forward clutch 3a can be shortened.

Moreover, if the target engine rotation speed TNe when the cancellation request for the sailing stop control is made is less than the first predetermined value, the target engine rotation speed TNe can be changed so that the absolute value of the difference between the rotation speed at the blown-up peak at the start of the engine 1 and the target engine rotation speed TNe becomes less than the second predetermined value by downshifting the continuously variable transmission 4 before the forward clutch 3a is engaged.

According to this, the time until the forward clutch 3a is engaged can be further shortened.

Moreover, if the target engine rotation speed TNe when the cancellation request for the sailing-stop control is made is less than the first predetermined value, the target engine rotation speed TNe can be changed so that the rotation speed at the blown-up peak at the start of the engine 1 and the target engine rotation speed TNe are made equal by downshifting the continuously variable transmission 4 before the forward clutch 3a is engaged.

According to this, the time until the forward clutch 3a is engaged can be further shortened.

Moreover, if the target engine rotation speed TNe when the cancellation request for the sailing-stop control is made is less than the first predetermined value, and if the cancellation request is accompanied by the downshift request, the continuously variable transmission 4 is further downshifted after the engagement of the forward clutch 3a.

According to this, if the cancellation request for the sailing-stop control is accompanied by the downshift request, the downshift can be performed stepwisely, whereby occurrence response of the driving force is improved.

Moreover, if the target engine rotation speed TNe when the cancellation request for the sailing-stop control is made is less than the first predetermined value, and if the cancellation request is not accompanied by the downshift request, the continuously variable transmission 4 is upshifted after the engagement of the forward clutch 3a.

According to this, if the cancellation request for the sailing-stop control is not accompanied by the downshift request, occurrence of acceleration in the vehicle not intended by the driver can be suppressed.

The embodiment of the present invention has been described, but the aforementioned embodiment only illustrates a part of an application example of the present invention and is not intended to limit the technical scope of the present invention to the specific constitution of the aforementioned embodiment.

For example, in the aforementioned embodiment, the case where the automatic transmission 15 has the forward/reverse switching mechanism 3 as the power transmission mechanism was described, but the automatic transmission 15 may have a sub-transmission mechanism as the power transmission mechanism. Moreover, the automatic transmission 15 may be constituted by having a stepped transmission or a toroidal continuously variable transmission, not by the continuously variable transmission 4, as the power transmission mechanism.

Moreover, in the aforementioned embodiment, it is assumed that the continuously variable transmission 4 is fixed to the Highest speed ratio during the sailing-stop control, and the example in which the target engine rotation speed TNe is acquired from the Highest speed ratio is described, but the speed ratio may be another speed ratio. In that case, too, the target engine rotation speed TNe can be acquired on the basis of the vehicle speed VSP and the through speed ratio of the automatic transmission 15.

With respect to the above description, the contents of application No. 2016-141577, with a filing date of Jul. 19, 2016 in Japan, are incorporated herein by reference.

The invention claimed is:

1. A control device for a vehicle including an engine and an automatic transmission having a variator and a power transmission mechanism, the control device comprising:
a control unit configured to execute a sailing-stop control which stops the engine and disengages an engagement element provided in the power transmission mechanism during running of the vehicle, wherein
the control unit is configured to give an engagement instruction to the engagement element so that the engagement element is engaged when a rotation speed of the engine becomes a target engine rotation speed set on the basis at least of a vehicle speed and a speed ratio of the variator after the engine is started, if a cancellation request for the sailing-stop control is made during execution of the sailing-stop control; and
the control unit is configured to raise the target engine rotation speed within a range not higher than a rotation speed of a blown-up peak at start of the engine by downshifting the variator before the engagement element is engaged and is configured to give the engagement instruction to the engagement element so that the engagement element is engaged when the engine rotation speed becomes the raised target engine rotation speed, if the target engine rotation speed when the cancellation request for the sailing-stop control is made is less than a first predetermined value.

2. The control device for a vehicle according to claim 1, wherein
the control unit is configured to change the target engine rotation speed so that an absolute value of a difference between a rotation speed at a blown-up peak at start of the engine and the target engine rotation speed is less than a second predetermined value by downshifting the variator before the engagement element is engaged, if the target engine rotation speed when the cancellation request for the sailing-stop control is made is less than the first predetermined value.

3. The control device for a vehicle according to claim 1, wherein
the control unit is configured to change the target engine rotation speed so that a rotation speed at a blown-up peak of the engine and the target engine rotation speed are made equal by downshifting the variator before the engagement element is engaged, if the target engine rotation speed when the cancellation request for the sailing-stop control is made is less than the first predetermined value.

4. The control device for a vehicle according to claim 1, wherein
the control unit is configured to further downshift the variator after engagement of the engagement element, if the target engine rotation speed when the cancellation request for the sailing-stop control is made is less than the first predetermined value, and if the cancellation request is accompanied by a downshift request.

5. The control device for a vehicle according to claim 1, wherein
the control unit is configured to upshift the variator after engagement of the engagement element, if the target engine rotation speed when the cancellation request for the sailing-stop control is made is less than the first predetermined value, and if the cancellation request is not accompanied by a downshift request.

6. A control method for a vehicle including an engine and an automatic transmission having a variator and a power transmission mechanism, the control method comprising:
executing a sailing-stop control which stops the engine and disengages an engagement element provided in the power transmission mechanism during running of the vehicle,
giving an engagement instruction to the engagement element so that the engagement element is engaged when a rotation speed of the engine becomes a target engine rotation speed set on the basis at least of a vehicle speed and a speed ratio of the variator after the engine is started, if a cancellation request for the sailing-stop control is made during execution of the sailing-stop control; and
raising the target engine rotation speed within a range not higher than a rotation speed of a blown-up peak at start of the engine by downshifting the variator before the engagement element is engaged and giving the engagement instruction to the engagement element so that the engagement element is engaged when the engine rotation speed becomes the raised target engine rotation speed, if the target engine rotation speed when the cancellation request for the sailing-stop control is made is less than a first predetermined value.

7. A control device for a vehicle including an engine and an automatic transmission having a variator and a power transmission mechanism, the control device comprising:
control means configured to execute a sailing-stop control which stops the engine and disengages an engagement element provided in the power transmission mechanism during running of the vehicle, wherein
the control means is configured to give an engagement instruction to the engagement element so that the engagement element is engaged when a rotation speed of the engine becomes a target engine rotation speed set on the basis at least of a vehicle speed and a speed ratio of the variator after the engine is started, if a cancellation request for the sailing-stop control is made during execution of the sailing-stop control; and
the control means is configured to raise the target engine rotation speed within a range not higher than a rotation speed of a blown-up peak at start of the engine by downshifting the variator before the engagement element is engaged and is configured to give the engagement instruction to the engagement element so that the engagement element is engaged when the engine rotation speed becomes the raised target engine rotation speed, if the target engine rotation speed when the cancellation request for the sailing-stop control is made is less than a first predetermined value.

* * * * *